March 17, 1931.  G. W. TAYLOR  1,796,813
ROLLER BEARING
Filed Dec. 10, 1928   2 Sheets-Sheet 2
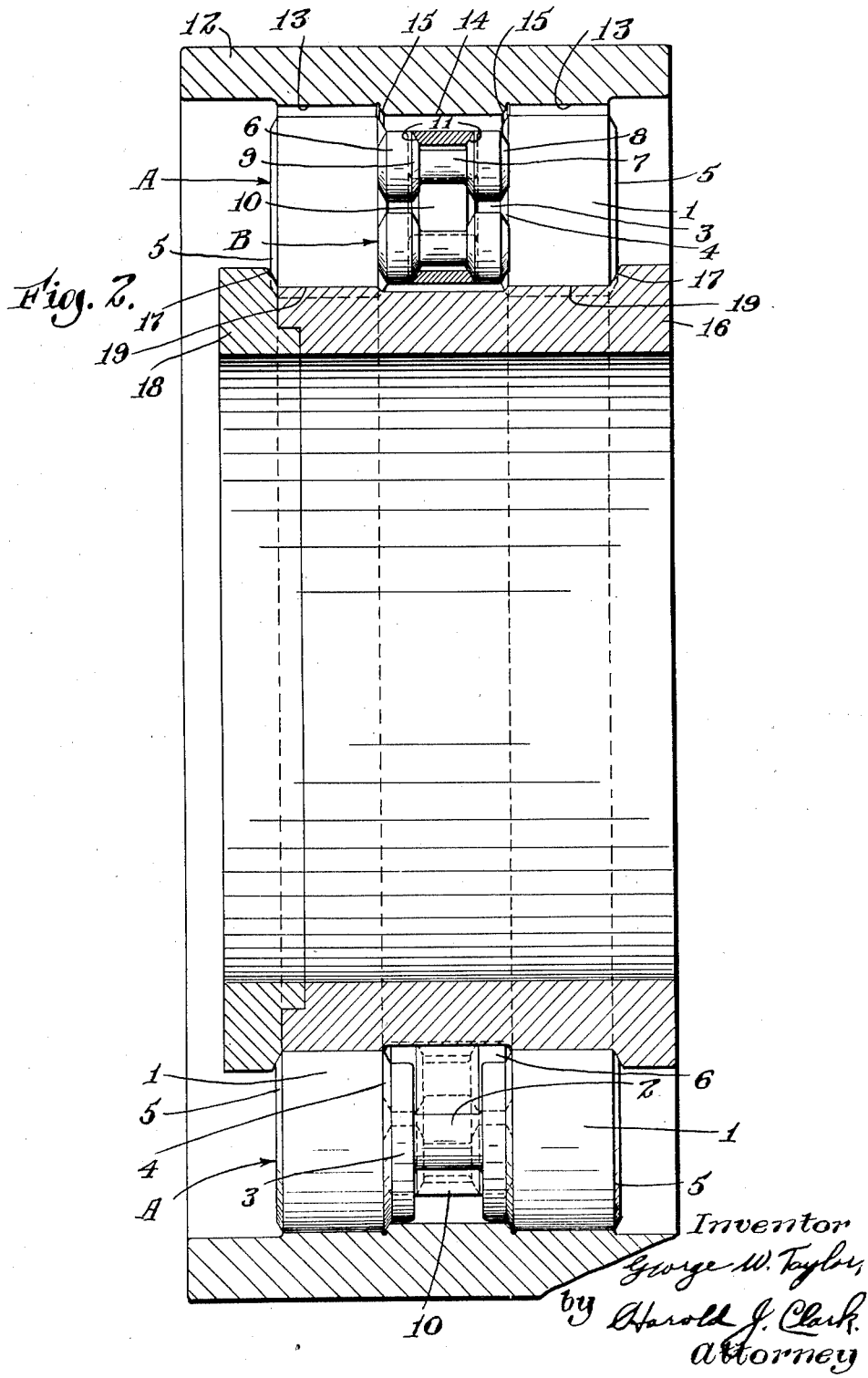

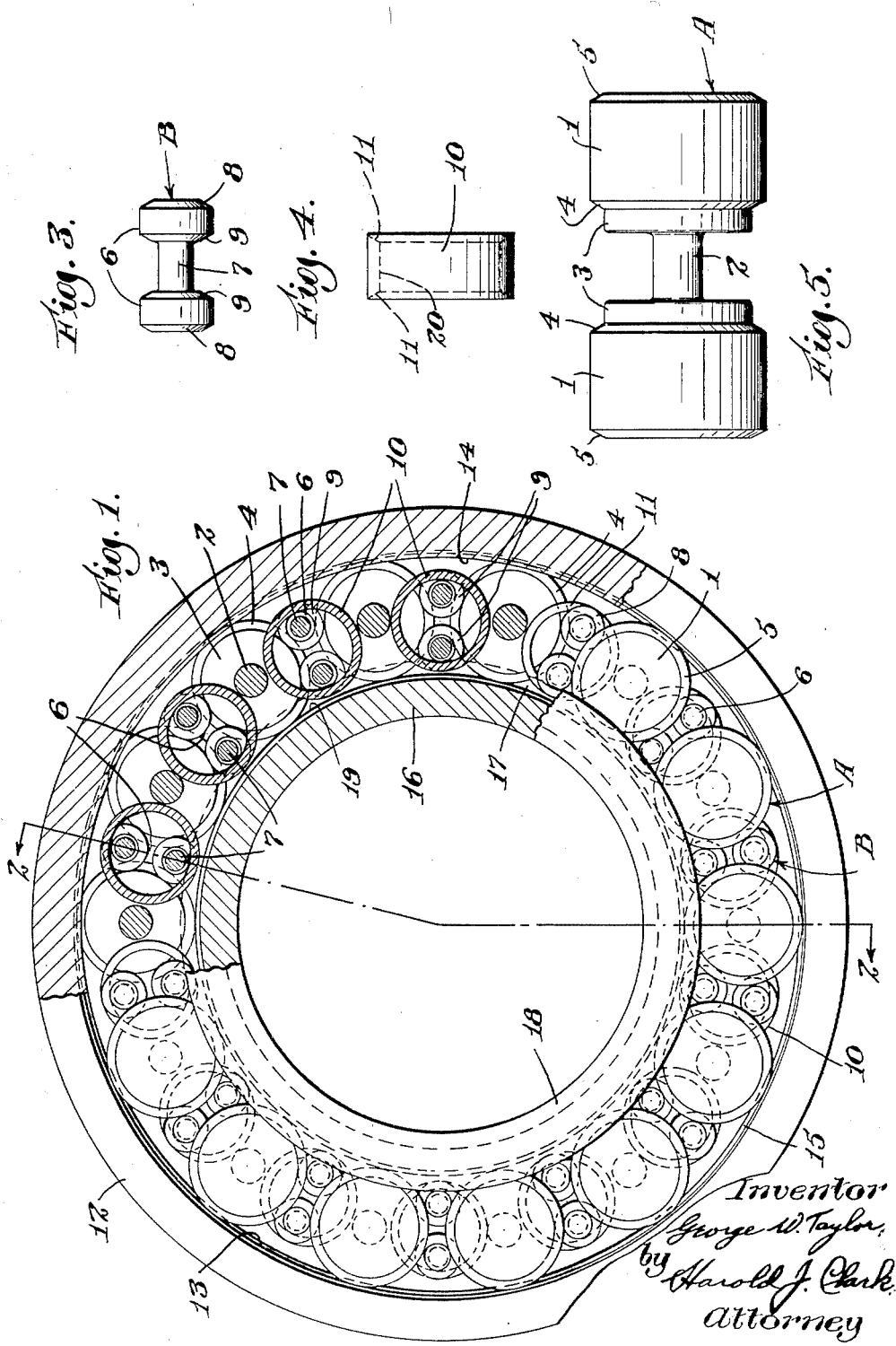

Patented Mar. 17, 1931

1,796,813

UNITED STATES PATENT OFFICE

GEORGE W. TAYLOR, OF BOSTON, MASSACHUSETTS, ASSIGNOR TO HAROLD J. CLARK, OF WALTHAM, MASSACHUSETTS

ROLLER BEARING

Application filed December 10, 1928. Serial No. 324,837.

The present invention relates to bearings, and more particularly to bearings in which cylindrical rollers are utilized to sustain or support the load, with separating rollers between each pair of supporting rollers.

A serious disadvantage and difficulty with bearings of this type heretofore has been the disproportionate ratio existing between the main supporting rollers and the separating rollers. This has resulted in a high speed of rotation of the separating rollers relative to the speed of rotation of the main supporting rollers, and as a consequence, the wear on the separating rollers has been tremendous, compared with the wear of the main supporting rollers.

An important object of the present invention, therefore, is to decrease the ratio between the main supporting rollers and the separating rollers. By the construction illustrated and described herein, I am enabled to materially decrease this ratio, the ratio between the main supporting rollers and the separating rollers illustrated in the drawings of the present application being two and a quarter to one, this being illustrative of the low ratios I am enabled to obtain by means of my invention.

This reduction of ratio between the supporting and separating rollers, as will be readily understood by those skilled in this art, results in greatly lengthening the life of the bearing, extending the life of bearings utilizing my invention to twice and even more than twice the life of present bearings utilizing separating rollers.

A further feature of the invention resides in the fact that my novel bearing is constructed on the principle of rolling contact, eliminating sliding friction, and resulting in a bearing which will not heat up in operation, whether lubricated or not, thus establishing the fact of absence of friction within the bearing.

My novel bearing is simple to manufacture and assemble, rugged, strong and durable, and has the further capacity and advantage of resisting end thrust and radial thrust in and of itself.

A further feature of the invention resides in the particular construction of the main supporting rollers, by means of which construction I am enabled to reduce or decrease the ratio between said main supporting rollers and the separating rollers.

The above and other objects and features of the invention, details of construction, combinations of parts, and advantages, will be hereinafter more fully pointed out, described and claimed.

Referring to the drawings, illustrating a preferred embodiment of the present invention, Fig. 1 is an end elevation, partly in section, of my novel bearing;

Fig. 2 is a cross-sectional view on the line 2—2 of Fig. 1;

Fig. 3 is a side elevation of one of the separating rollers;

Fig. 4 is a side elevation of the retaining ring for the separating rollers; and Fig. 5 is a side elevation of one of the main supporting rollers.

Referring now to the drawings, for a particular description of the invention, its construction and assembly, my novel roller bearing is composed of a plurality or series of main supporting rollers designated generally at A, each of these supporting rollers comprising two cylindrical members 1 connected by a bar 2, this bar 2 being of considerably less diameter than the diameter of the members 1 and thus providing a groove in said roller between said members 1.

Each member 1 is provided with a step-down or reduced portion or shoulder 3 on its inner side, and is also provided with a beveled edge 4 adjacent to said step-down, said bevel 4 extending from the outer surface of the member to the shoulder. Each member 1 is also provided with an outer beveled edge 5, all of these features being clearly illustrated in Fig. 5.

Between each pair of main supporting rollers A is mounted a pair of separating rollers designated generally at B, and clearly shown in Fig. 3. Each of these separating rollers B comprises a pair of cylindrical members 6, 6, connected or united by a bar 7, each member 6 being provided with an outer beveled edge 8 and an inner beveled edge 9.

When in assembled position, the cylindrical surfaces of the members 6 will engage with and roll on the shoulders or step-down portions 3. Because of the presence of the shoulders 3 on the main supporting rollers A, I am enabled to materially increase the diameter of the cylindrical members 6, and hence to materially reduce the ratio between the cylindrical members 1 and the cylindrical members 6. The ratio illustrated in the drawings of the present application is two and a quarter to one, a ratio which it has been heretofore considered impossible of attainment.

It will be instantly apparent to those skilled in the art that, because of the decrease of ratio between the members 1 and the members 6, the speed of rotation of the members 6 relative to the speed of rotation of the members 1 will be materially reduced, and hence the life of the bearing will be considerably lengthened and the efficiency of the bearing increased.

When in assembled position, also, the outer beveled edges 8 of the members 6 will engage the inner beveled edges 4 of the members 1, thus retaining the rollers A in constant alinement.

The retaining ring 10 is adapted to enclose each pair of separating rollers, the beveled edges 11 of said ring riding on the inner beveled edges 9 of the members 6, although if desired, the inner surface 20 of the ring 10 may ride on the bars 7 of said separating rollers B. This ring 10 retains the separating rollers in assembled position, and further assists in enabling said separating rollers to carry out their alining function.

The units as thus far described are mounted in an outer sleeve 12 having a pair of races 13 on which the cylindrical surfaces of the members 1 roll. This outer sleeve 12 also has a depending central rib 14 provided with outer beveled edges 15. This rib is adapted to seat in the groove formed in each main supporting roller A, and the beveled edges 15 are adapted to engage and cooperate with the inner beveled edges 4 of the members 1 to retain said rollers A in alinement, and to prevent longitudinal displacement thereof.

When completely assembled on the outer sleeve 12, the inner sleeve 16 is slid into position and the ring 18 dovetailed therewith to form the entire inner sleeve. This inner sleeve 16 has a pair of bearing races 19 parallel with and opposed to the bearing races 13, the main supporting rollers A being confined between and rolling on said parallel opposed races 13 and 19.

The inner sleeve, also, is provided with a pair of flanges or ribs each having a beveled edge 17 to cooperate with the beveled edges 5 of the members 1 to further retain said rollers A in position and prevent longitudinal displacement or any misalignment thereof.

The bearing illustrated and described in the present application is simple to manufacture, construct and assemble, is efficient to a high degree, and since I believe the same is novel, I have claimed the same broadly in the present application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a roller bearing, a series of main supporting rollers, each roller comprising a pair of cylindrical members and a connecting bar, a cylindrical shoulder on the inner side of each cylindrical member, said shoulders being of less diameter than said cylindrical members, and a pair of separating rollers between each pair of supporting rollers, said separating rollers engaging with and rolling on said shoulders.

2. In a roller bearing, a series of main supporting rollers, each roller comprising a pair of cylindrical members and a connecting bar, a cylindrical shoulder on the inner side of each cylindrical member, said shoulders being of less diameter than said cylindrical members, each cylindrical member having an inner beveled edge extending from the surface thereof to the surface of said shoulder, and a pair of separating rollers between each pair of supporting rollers, said separating rollers engaging with and rolling on said shoulders, and each separating roller having an outer beveled edge cooperating with said inner beveled edges of said cylindrical members.

3. In a roller bearing, a series of main supporting rollers, each roller comprising a pair of cylindrical members and a connecting bar, a cylindrical shoulder on each cylindrical member, said shoulders being of less diameter than said cylindrical members, and a pair of separating rollers between each pair of supporting rollers, said separating rollers engaging with and rolling on said shoulders.

4. In a roller bearing, a series of main supporting rollers, each roller comprising a pair of cylindrical members and a connecting bar, a cylindrical shoulder on each cylindrical member, said shoulders being of less diameter than said cylindrical members, each cylindrical member having a beveled edge extending from the surface thereof to the surface of said shoulder, and a pair of separating rollers between each pair of supporting rollers, said separating rollers engaging with and rolling on said shoulders, each separating roller having beveled edges cooperating with said beveled edges of said cylindrical members.

5. In a roller bearing, inner and outer concentric sleeves, parallel opposed faces of said sleeves forming a race, a series of main supporting rollers rolling on the opposed bearing faces of said race, each roller comprising a pair of cylindrical members and a connecting bar and having an annular groove therein, a cylindrical shoulder on the inner end of each cylindrical member, said shoulders being of less diameter than said cylindrical members, each cylindrical member having an inner beveled edge extending from the rolling surface thereof to the rolling surface of said shoulder, a pair of separating rollers between each pair of supporting rollers, said separating rollers engaging with and rolling on said shoulders, each separating roller having outer beveled edges cooperating with said inner beveled edges of said cylindrical members, and a beveled rib in said outer sleeve projecting into said annular grooves and cooperating with the inner beveled edges of said cylindrical members to retain said supporting rollers in alinement and prevent longitudinal displacement thereof.

In testimony whereof, I have signed my name to this specification.

GEORGE W. TAYLOR.